(12) United States Patent
Yamashita

(10) Patent No.: US 11,420,688 B2
(45) Date of Patent: Aug. 23, 2022

(54) VEHICLE ATTACHMENT STRUCTURE

(71) Applicant: TOYOTA JIDOSHA KABUSHIKI KAISHA, Toyota (JP)

(72) Inventor: Yoshiya Yamashita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 48 days.

(21) Appl. No.: 17/150,234

(22) Filed: Jan. 15, 2021

(65) Prior Publication Data

US 2021/0316796 A1    Oct. 14, 2021

(30) Foreign Application Priority Data

Apr. 8, 2020 (JP) .............................. JP2020-069724

(51) Int. Cl.
*B62D 27/06* (2006.01)
*F01N 13/10* (2010.01)

(52) U.S. Cl.
CPC ............. *B62D 27/06* (2013.01); *F01N 13/10* (2013.01)

(58) Field of Classification Search
CPC ..... B62D 27/06; F01N 13/10; F01N 2450/18; F01N 13/1838; F01N 13/1805; F01N 13/105; F01N 13/1855; B60K 13/04; B60K 2001/0455; B60K 2001/0477; B60K 1/04

USPC ..................................................... 296/193.03
See application file for complete search history.

(56) References Cited

U.S. PATENT DOCUMENTS

| 11,174,801 B2* | 11/2021 | Ninomiya ............... F02D 11/10 |
| 2015/0225022 A1* | 8/2015 | Schmeichel ........... B62D 33/04 |
| | | 296/100.16 |
| 2018/0043942 A1* | 2/2018 | Coman ............... B60R 13/0206 |
| 2022/0042430 A1* | 2/2022 | Camella ............. F01N 13/1805 |

FOREIGN PATENT DOCUMENTS

JP        2010-048114 A    3/2010

* cited by examiner

*Primary Examiner* — Pinel E Romain
(74) *Attorney, Agent, or Firm* — Finnegan, Henderson, Farabow, Garrett & Dunner, LLP

(57) ABSTRACT

A vehicle attachment structure includes: a fixing member paired up with at least part of one component out of the first component and the second component, the fixing member being configured to fix at least part of the other component out of the first component and the second component and release the fixation; and a coupled member placed in the one component at a position corresponding to the fixing member, the coupled member being made of a magnetic material. The fixing member includes a magnet placed at a position corresponding to the coupled member, and a connecting mechanism connected to the magnet and configured to turn or rock the magnet so that the magnet approaches or separates from the coupled member.

7 Claims, 5 Drawing Sheets

VEHICLE ATTACHMENT STRUCTURE

CROSS-REFERENCE TO RELATED APPLICATION

This application claims priority to Japanese Patent Application No. 2020-069724 filed on Apr. 8, 2020, incorporated herein by reference in its entirety.

BACKGROUND

1. Technical Field

The present disclosure relates to a vehicle attachment structure and, more specifically, to a vehicle attachment structure used for a vehicle and configured to detachably attach a second component to a first component fixed to a vehicle body.

2. Description of Related Art

In the related art, as this type of vehicle attachment structure, there has been proposed a vehicle attachment structure configured to detachably attach a second component (a liner) to a first component (an exhaust manifold) (e.g., see Japanese Unexamined Patent Application Publication No. 2010-048114 (JP 2010-048114 A)). The first component is formed into a tubular shape with a C-shaped section. The second component is formed into a shape with a C-shaped section, and a slit is formed in the second component in its longitudinal direction. At the time when the second component is attached to the first component, the second component is inserted into an inner wall of the first component in a state where the slit is elastically deformed to a closing side to reduce the second component in diameter. After the second component is inserted into the inner wall of the first component, the slit is released, so that the second component is increased in diameter. Hereby, the second component is held, in the radial direction, by an inner wall surface of the first component and is held, in the longitudinal direction, by a bead portion formed on the inner wall surface in a swelling manner. Thus, the second component is attached to the first component.

SUMMARY

However, with the vehicle attachment structure, it is necessary to elastically deform the second component when the second component is attached and detached to and from the first component. On that account, it is hard to say that the second component can be easily attached and detached to and from the first component.

A main object of a vehicle attachment structure according to the present disclosure is to easily attach and detach a second component to and from a first component.

In order to achieve the main object, the vehicle attachment structure of the present disclosure employs the following approach.

A vehicle attachment structure according to the present disclosure is a vehicle attachment structure used for a vehicle and configured to detachably attach a second component to a first component fixed to a vehicle body. The vehicle attachment structure includes a fixing member and a coupled member. The fixing member is paired up with at least part of one component out of the first component and the second component, and the fixing member is configured to fix at least part of the other component out of the first component and the second component and release the fixation. The coupled member is placed in the one component at a position corresponding to the fixing member, the coupled member being made of a magnetic material. The fixing member includes: a magnet placed at a position corresponding to the coupled member; and a connecting mechanism connected to the magnet and configured to turn or rock the magnet so that the magnet approaches or separates from the coupled member.

The vehicle attachment structure of the present disclosure includes: the fixing member paired up with at least part of one component out of the first component and the second component so as to fix at least part of the other component out of the first component and the second component by sandwiching the at least part of the other component between the fixing member and the at least part of the one component; and the coupled member placed in the first component or the second component at the position corresponding to the fixing member, the coupled member being made of a magnetic material. The fixing member includes the magnet placed at the position corresponding to the coupled member, and the connecting mechanism connected to the magnet and configured to turn the magnet so that the magnet approaches or separates from the coupled member. Hereby, when the magnet approaches the coupled member by the connecting mechanism, a magnetic force to be applied to the coupled member becomes strong, so that the other component (the second component or the first component) is fixed by the fixing member and the one component (the first component or the second component) in which the coupled member is placed. Hereby, the second component is attached to the first component. When the magnet separates from the coupled member by the connecting mechanism, the magnetic force to be applied to the coupled member becomes weak, and the fixation of the other component (the second component or the first component) by the fixing member and the one component (the first component or the second component) in which the coupled member is placed is released. Hereby, the second component is detached from the first component. Accordingly, the second component can be attached and detached to and from the first component without elastic deformation of the first component or the second component. As a result, the attachment and detachment of the second component to and from the first component can be easily performed.

In the vehicle attachment structure of the present disclosure, the connecting mechanism may include an operating lever having one end connected to the magnet. The connecting mechanism may turn the magnet along with turning of the operating lever. The magnet may have a shape with a flat section and is placed such that a flat surface of the magnet faces the coupled member along with rotation. This allows the magnet to approach or separate from the coupled member by turning of the operating lever. Hereby, the attachment and detachment of the second component to and from the first component can be easily performed.

In this case, the fixing member may be paired up with part of the first component so as to fix part of the second member by sandwiching the part of the second component between the fixing member and the part of the first component. The coupled member may be placed in the first component at a position corresponding to the fixing member. In this case, the first component may be a cylinder head, and the second component may be an exhaust manifold. Hereby, the attachment and detachment of the exhaust manifold to and from the cylinder head can be easily performed.

Further, in the vehicle attachment structure of the present disclosure, the connecting mechanism may include: an operating lever having one end connected to the magnet, and a connecting portion via which an intermediate part of the operating lever is turnably connected to a housing in which the magnet is accommodated. Along with turning of the operating lever, the connecting mechanism may rock the magnet with the connecting portion as a fulcrum in a direction where the magnet approaches or separates from the coupled member. This allows the magnet to approach or separate from the coupled member along with turning of the operating lever. Hereby, the attachment and detachment of the second component to and from the first component can be easily performed.

In this case, the fixing member may be paired up with part of the second component so as to fix part of the first component by sandwiching the part of the first component between the fixing member and the part of the second component. The coupled member may be placed in the second component at a position corresponding to the fixing member. The first component may be a rail, and the second component may include a battery and a moving mechanism attached to the battery and configured to move over the rail. With this configuration, it is possible to easily perform the attachment and detachment of the battery to and from the rail.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next will be described a mode for carrying out the disclosure with reference to an embodiment.

Figure 1:
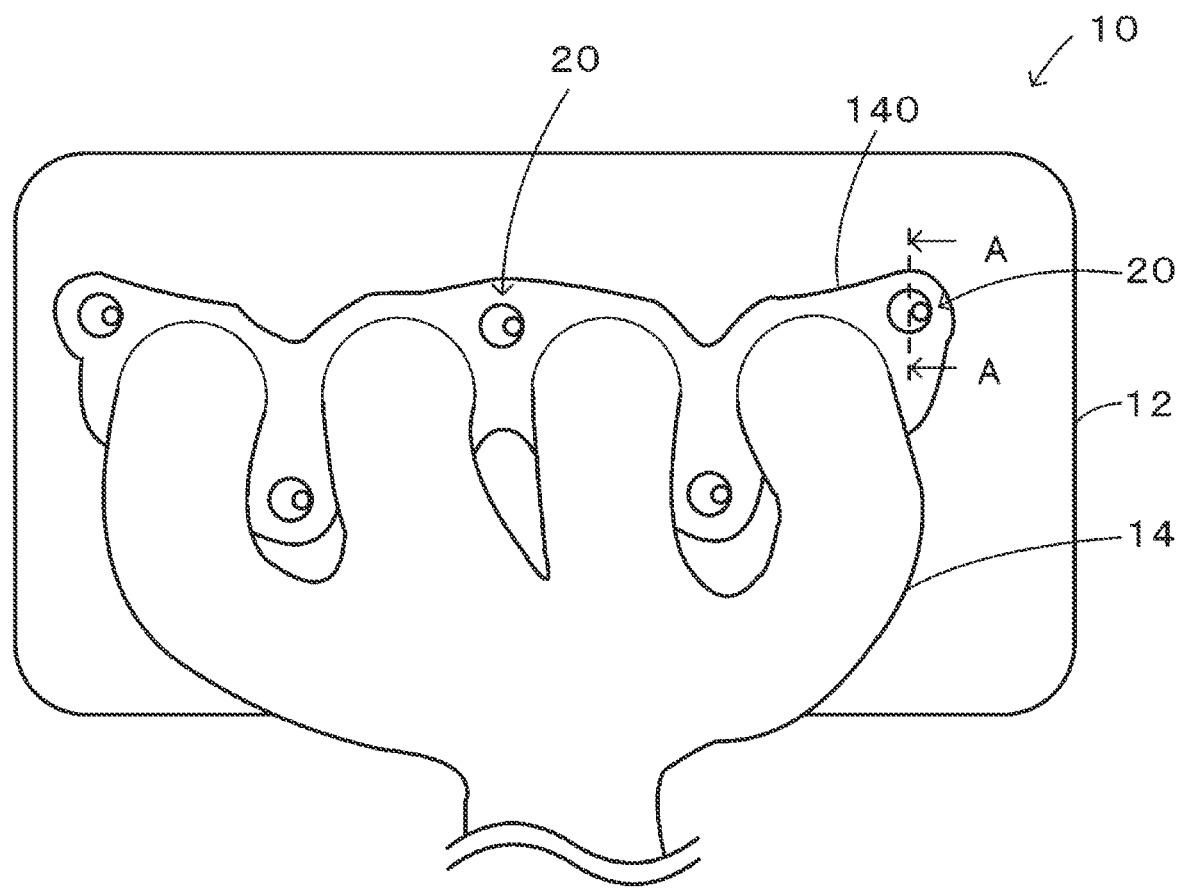
FIG. 1 is a configuration diagram illustrating an outline of a configuration of an exhaust device 10 using a vehicle attachment structure 20 as a first embodiment of the present disclosure.
Figure 2:
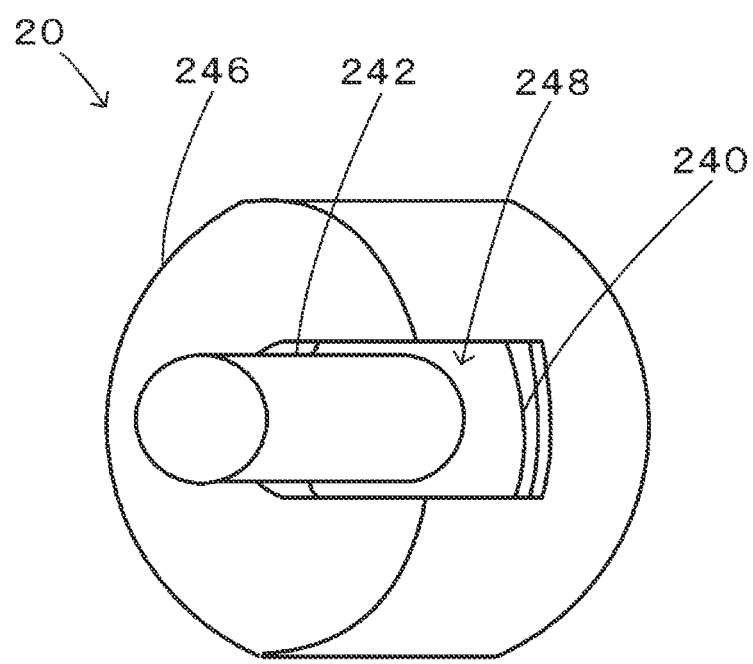
FIG. 2 is an external-appearance schematic view illustrating an external appearance of an essential part of the vehicle attachment structure 20.
Figure 3:
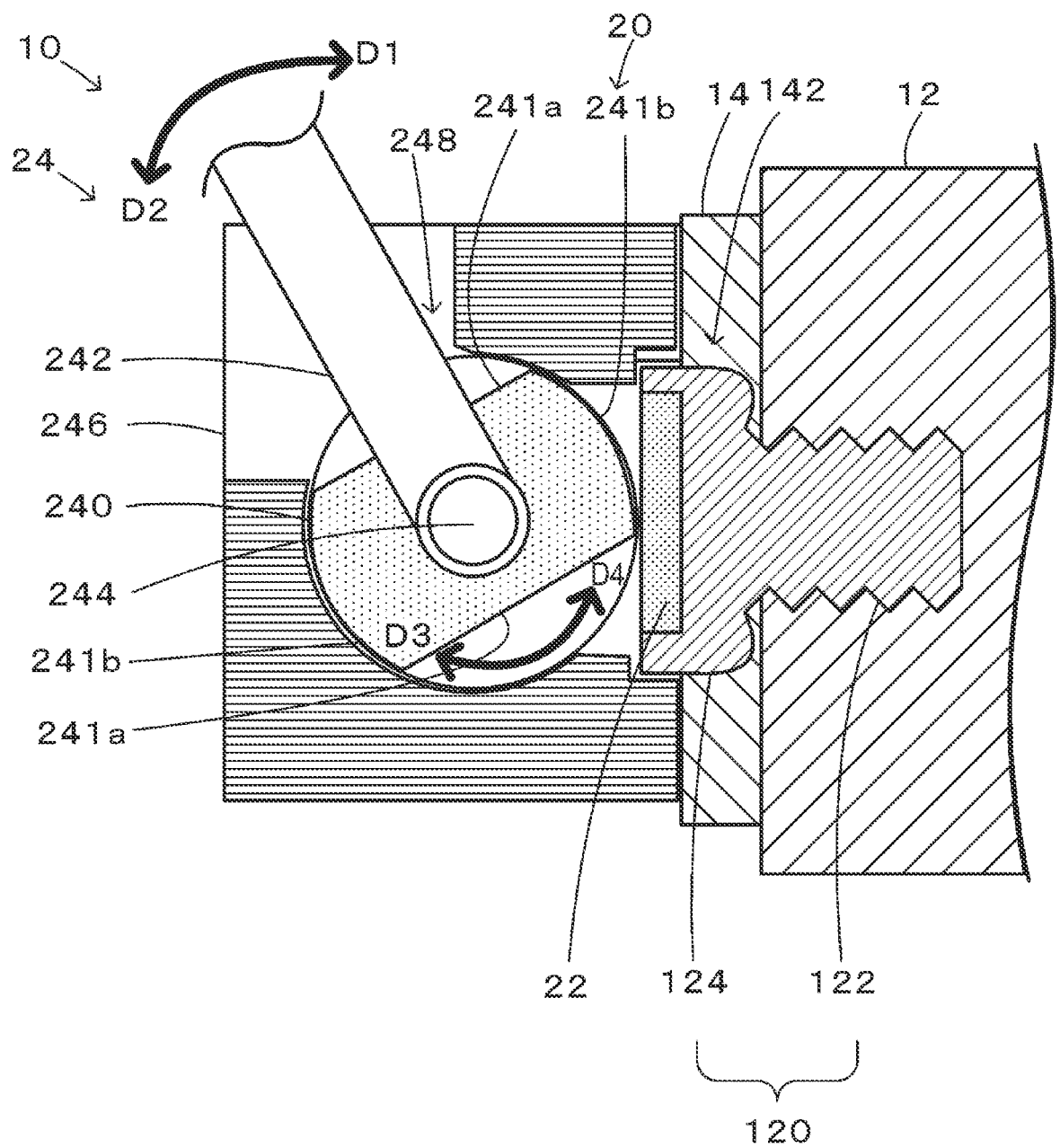
FIG. 3 is a sectional schematic view illustrating an outline of a section along a line A-Ain FIG. 1.

FIG. 1 is a configuration diagram illustrating an outline of a configuration of an exhaust device 10 using a vehicle attachment structure 20 as a first embodiment of the present disclosure. FIG. 2 is an external-appearance schematic view illustrating an outline of an external appearance of an essential part of the vehicle attachment structure 20. FIG. 3 is a sectional schematic view illustrating an outline of a section along a line A-A in FIG. 1. In FIG. 3, thick arrows indicate direction where an operating lever 242 and a magnet 240 turn. The exhaust device 10 is configured as an exhaust system for an engine provided in a vehicle and includes a cylinder head 12, an exhaust manifold 14, and a vehicle attachment structure 20.

The cylinder head 12 is made of a nonmagnetic material (for example, aluminum and so on). The cylinder head 12 is fixed to a vehicle body. A screw 120 is attached to the cylinder head 12. The screw 120 is made of a nonmagnetic material (for example, aluminum and so on). A threaded portion 122 is attached to the cylinder head 12, and a head 124 is inserted into an opening 142 of the exhaust manifold 14. The head 124 is formed to have a dimension with a clearance, to the opening 142, that allows the exhaust manifold 14 to be easily detached from the head 124 when a fixing member 24 is detached.

The exhaust manifold 14 is made of a magnetic material (for example, SUS and so on). The exhaust manifold 14 is attached to the cylinder head 12 via five vehicle attachment structures 20 at five attachment positions in a flange portion 140 provided in a distal end of the exhaust manifold 14 on the cylinder head 12 side.

The vehicle attachment structure 20 includes a coupled member 22 and the fixing member 24.

The coupled member 22 is made of a magnetic material (for example, iron and so on) and embedded in the head 124 of the screw 120.

The fixing member 24 includes a magnet 240, an operating lever 242, and a housing 246. The magnet 240 has a shape with a flat section and is placed at a position corresponding to the coupled member 22 such that a flat surface 241a or a curved surface 241b faces the coupled member 22 along with rotation. As the magnet 240, a neodymium magnet with a relatively strong magnetic force is used, for example. One end part of the operating lever 242 is connected to the magnet 240 via a fastening member 244. Accordingly, when the operating lever 242 is turned, the magnet 240 turns in the same direction as the operating lever 242. When the operating lever 242 is turned in a direction D1 in FIG. 3, for example, the magnet 240 turns in a direction D3. When the operating lever 242 is turned in a direction D2 in FIG. 3, the magnet 240 turns in a direction D4. The magnet 240 is accommodated in the housing 246, and the operating lever 242 extends from an opening 248 of the housing 246.

In the exhaust device 10 provided with the vehicle attachment structure 20 of the first embodiment that is configured as described above, the exhaust manifold 14 is attached to the cylinder head 12 in the following procedure. In a state where the head 124 of the screw 120 is inserted into the opening 142 of the exhaust manifold 14 in the vehicle attachment structure 20 so that the exhaust manifold 14 is pressed against the cylinder head 12 side by the fixing member 24, the operating lever 242 is turned in a direction where the curved surface 241b of the magnet 240 faces the coupled member 22 (for example, the direction D1 when the operating lever 242 is in the state illustrated in FIG. 3), and the operating lever 242 is stopped at a position where the curved surface 241b of the magnet 240 faces the coupled member 22. Since the distance between the curved surface 241b of the magnet 240 and the coupled member 22 is shorter than the distance between the flat surface 241a and the coupled member 22, a magnetic force to be applied to the coupled member 22 becomes large. Accordingly, the cylinder head 12 to which the screw 120 with the coupled member 22 embedded therein is attached and the fixing member 24 can surely fix the flange portion 140 of the exhaust manifold 14 with a larger force.

The exhaust manifold 14 is detached from the cylinder head 12 in the following procedure. The operating lever 242 is turned in a direction where the flat surface 241a of the magnet 240 faces the coupled member 22 (for example, the direction D2 when the operating lever 242 is in the state illustrated in FIG. 3), so that the operating lever 242 is stopped at a position where the flat surface 241a of the magnet 240 faces the coupled member 22. Since the distance between the flat surface 241a of the magnet 240 and the coupled member 22 is longer than the distance between the curved surface 241b and the coupled member 22, the magnetic force to be applied to the coupled member 22 becomes small, so that the fixation of the flange portion 140 of the exhaust manifold 14 by the cylinder head 12 and the fixing member 24 is released. Hereby, the fixing member 24 and the exhaust manifold 14 can be detached from the cylinder head 12.

As such, in the exhaust device 10 provided with the vehicle attachment structure 20, the exhaust manifold 14 can be attached and detached to and from the cylinder head 12 by turning the operating lever 242. Hereby, the attachment and detachment of the exhaust manifold 14 to and from the cylinder head 12 can be easily performed.

In the exhaust device 10 provided with the vehicle attachment structure 20 of the first embodiment as described above, the coupled member 22 is placed in the cylinder head 12 at a position corresponding to the fixing member 24, the magnet 240 is placed in the fixing member 24 at a position corresponding to the coupled member 22, and the operating lever 242 configured to turn the magnet 240 so that the magnet 240 approaches or separates from the coupled member 22 is connected to the magnet 240. Hereby, the attachment and detachment of the exhaust manifold 14 to and from the cylinder head 12 can be easily performed.

Further, the magnet 240 is formed in a shape having a flat section and is placed such that the flat surface 241a can face the coupled member 22 along with rotation. This allows the magnet 240 to approach or separate from the coupled member 22 along with turning of the operating lever 242. Hereby, the attachment and detachment of the exhaust manifold 14 to and from the cylinder head 12 can be easily performed.

In the exhaust device 10 provided with the vehicle attachment structure 20 of the first embodiment, the exhaust manifold 14 is attached to the cylinder head 12 via the five vehicle attachment structures 20 at the five attachment positions in the flange portion 140 provided in the distal end of the exhaust manifold 14 on the cylinder head 12 side. However, it is not necessary to use the vehicle attachment structures 20 for all the attachment positions in the flange portion 140, provided that the vehicle attachment structure 20 is used for at least one of the attachment positions. Other fastening members such as a bolt, for example, may be used for the other attachment positions.

The first embodiment deals with a case where the vehicle attachment structure 20 is applied to the exhaust device 10. However, the vehicle attachment structure 20 can be applied to any device, provided that the device is configured such that a second component is detachably attached to a first component fixed to a vehicle body.

Figure 4:
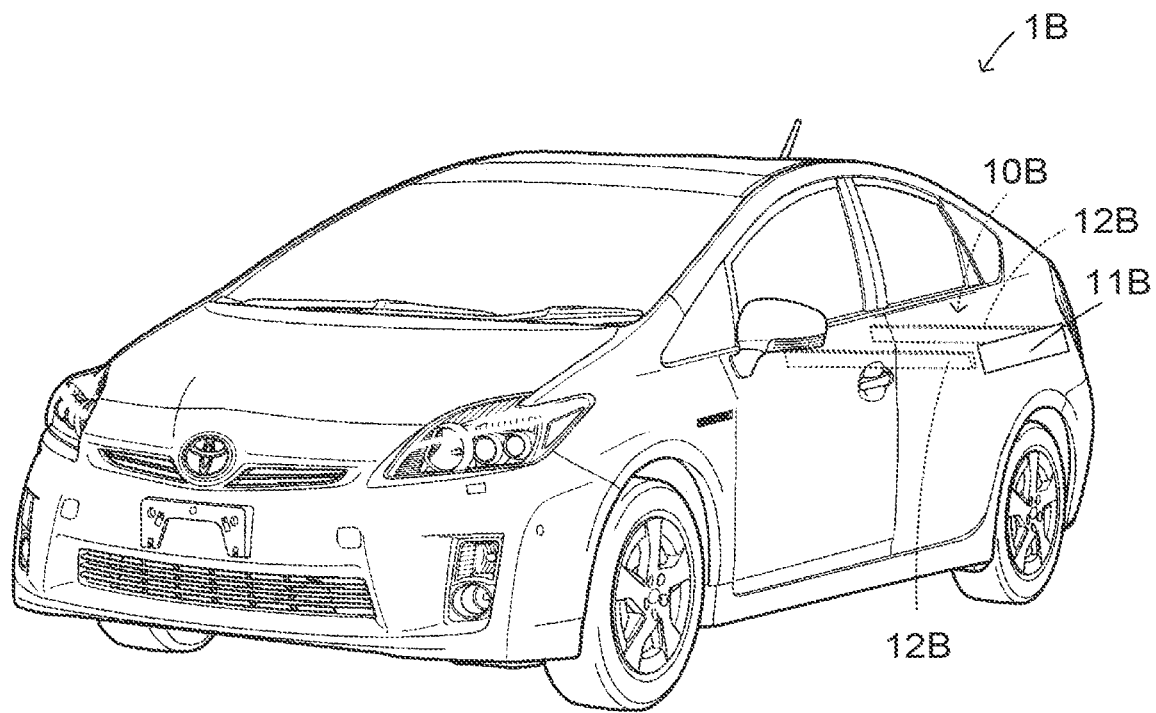
FIG. 4 is an external-appearance schematic view illustrating an outline of an external appearance of an electric vehicle 1B equipped with a battery device 10B provided with a vehicle attachment structure 20B as a second embodiment of the present disclosure.
Figure 5:
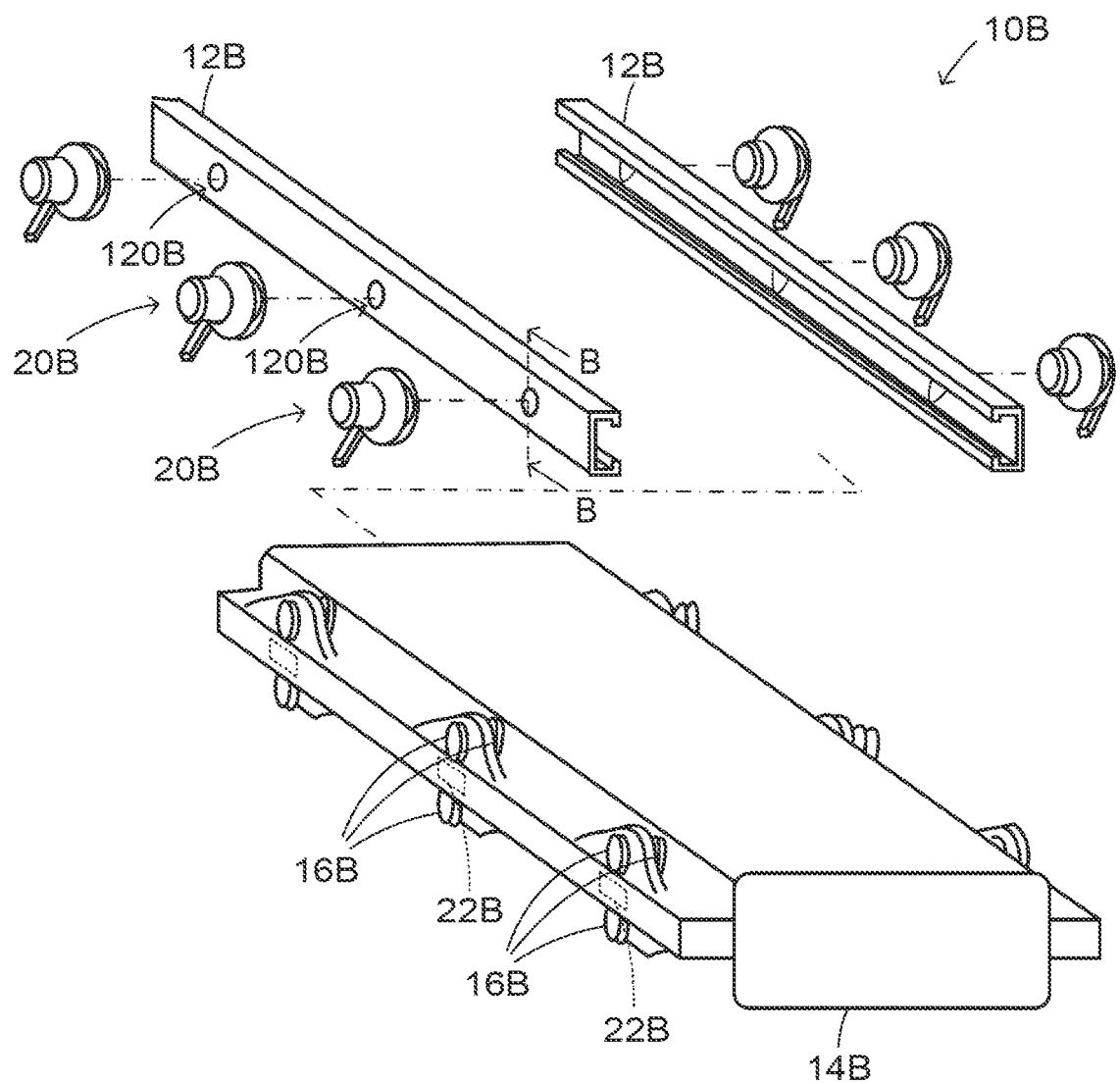
FIG. 5 is a schematic view illustrating an outline of the battery device 10B in an exploded manner.
Figure 6:
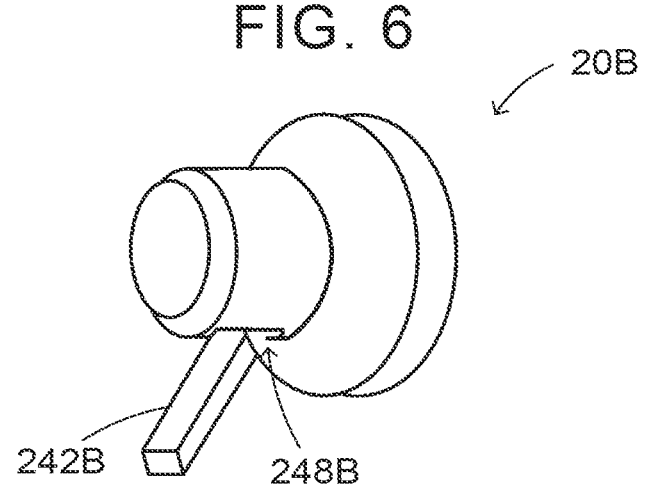
FIG. 6 is an external-appearance schematic view illustrating an outline of an external appearance of an essential part of the vehicle attachment structure 20B.
Figure 7:
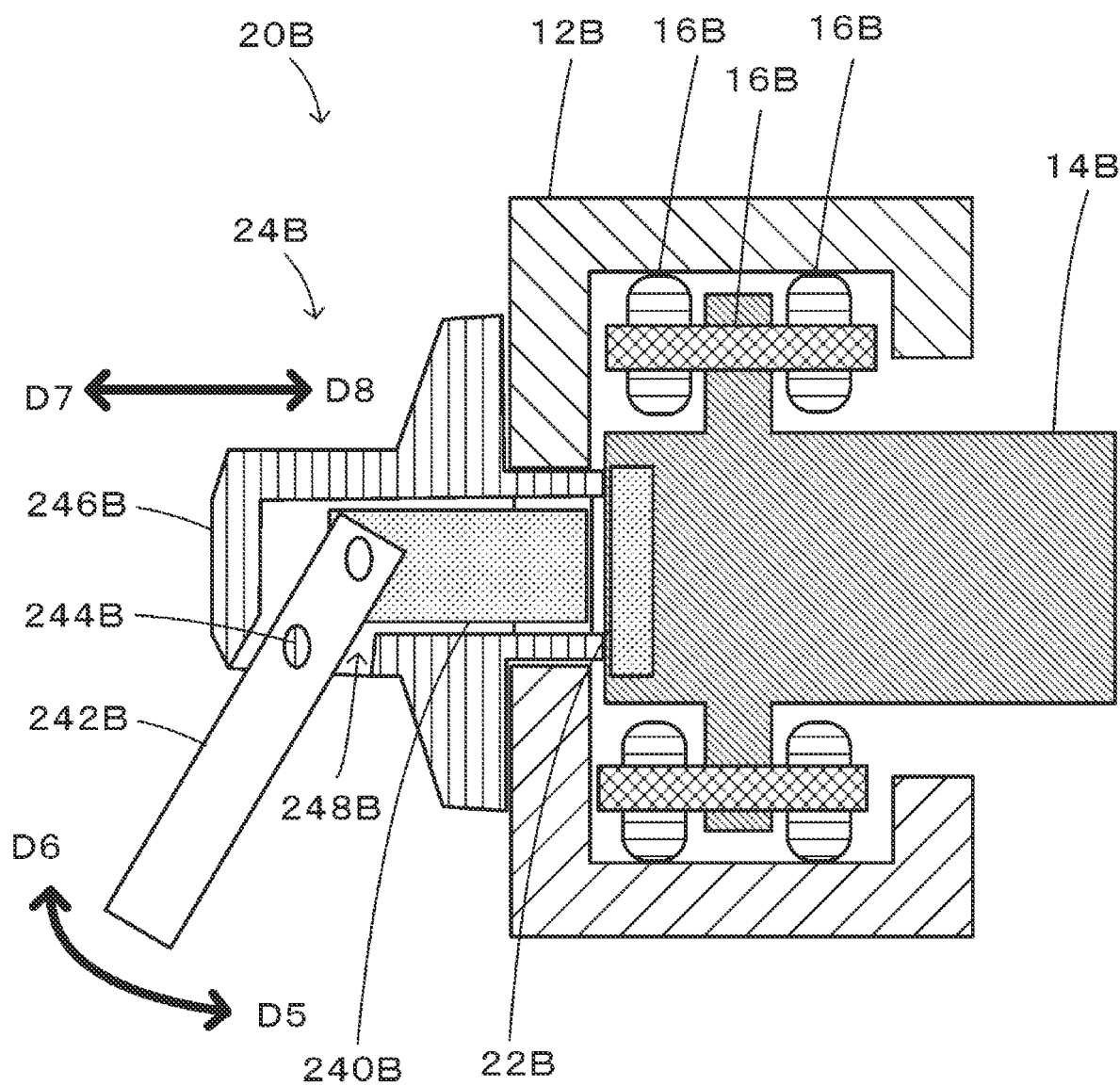
FIG. 7 is a sectional schematic view illustrating an outline of a section along a line B-B in FIG. 5.

FIG. 4 is an external-appearance schematic view illustrating an outline of an external appearance of an electric vehicle 1B equipped with a battery device 10B provided with a vehicle attachment structure 20B as a second embodiment of the present disclosure. Note that, in FIG. 4, a battery 14B is not illustrated for purpose of this description. FIG. 5 is a schematic view illustrating an outline of the battery device 10B in an exploded manner. FIG. 6 is an external-appearance schematic view illustrating an outline of an external appearance of an essential part of the vehicle attachment structure 20B. FIG. 7 is a sectional schematic view illustrating an outline of a section along a line B-B in FIG. 5. In FIG. 7, thick arrows indicate directions where an operating lever 242B turns and directions where a magnet 240B rocks.

The electric vehicle 1B is configured as an automobile that travels by power from a motor (not shown) and includes a battery device 10B configured to supply electric power to the motor. The battery device 10B is placed in a rear part of the electric vehicle 1B. An opening and closing door 11B via which the battery 14B of the battery device 10B is put in and out is formed on a rear side surface of the electric vehicle 1B.

The battery device 10B includes a pair of vehicle side rails 12B, the battery 14B, a plurality of pulleys 16B, and six vehicle attachment structures 20B.

The vehicle side rails 12B are made of a nonmagnetic material (for example, aluminum and so on) and attached to a vehicle body. The vehicle side rails 12B have a lateral square-U-shaped section and are formed such that the pulleys 16B are held by the vehicle side rails 12B and the pulleys 16B are movable inside the vehicle side rails 12B. Six attachment holes 120B via which the six vehicle attachment structures 20B are attached are formed in the vehicle side rails 12B.

The battery 14B is configured as a lithium-ion battery or a nickel metal hydride battery, for example. The pulleys 16B are attached to side surfaces of the battery 14B on respective sides closer to the vehicle side rails 12B. The battery 14B is attached at six attachment positions in the vehicle side rails 12B via the six vehicle attachment structures 20B.

The pulleys 16B are provided such that two pulleys 16B as a pair are respectively attached to the opposite ends of each rotating shaft 160B that slidably penetrates its corresponding projection portion formed on the side surface of the battery 14B on the vehicle side rail 12B.

The vehicle attachment structure 20B includes a coupled member 22B and a fixing member 24B.

The coupled member 22B is made of a magnetic body (for example, iron and so on) and embedded near the side surface of the battery 14B on the vehicle side rail 12B side.

The fixing member 24B includes a magnet 240B, an operating lever 242B, a fastening member 244B, and a housing 246B. The magnet 240B has a generally cylindrical shape and is placed to face the coupled member 22B. As the magnet 240B, a neodymium magnet with a relatively strong magnetic force is used, for example. One end of the operating lever 242B is connected to the magnet 240B. The fastening member 244B connects an intermediate part of the operating lever 242B to a housing 246B in a turnable manner. Accordingly, when the operating lever 242B is turned, the magnet 240B is rocked with the fastening member 244B as a fulcrum in a direction where the magnet 240B approaches or separate from the coupled member 22B. When the operating lever 242B is turned in a direction D5 in FIG. 7, for example, the magnet 240B rocks in a direction (a direction D7 of FIG. 7) where the magnet 240B separates from the coupled member 22B. When the operating lever 242B is turned in a direction D6 in FIG. 7, the magnet 240B rocks in a direction (a direction D8 of FIG. 7) where the magnet 240B approaches the coupled member 22B. The magnet 240B is accommodated in the housing 246B, and the operating lever 242B extends from an opening 248B of the housing 246B.

In the battery device 10B provided with the vehicle attachment structure 20B of the second embodiment that is configured as described above, the battery 14B is attached to the vehicle side rails 12B in the following procedure. In a state where the opening and closing door 11B of the electric vehicle 1B is opened, one end of the battery 14B is brought into contact with one ends of the vehicle side rails 12B on the opening and closing door 11B side, and the battery 14B is slid to inside the vehicle such that the pulleys 16B are held by the vehicle side rails 12B. Then, the battery 14B is placed at a position where the coupled members 22B align with their corresponding attachment holes 120B of the vehicle side rails 12B, and the opening and closing door 11B is closed. Subsequently, the vehicle attachment structures 20B are placed in the attachment holes 120B from inside the vehicle. When the operating lever 242B is turned in the direction (the direction D6 in FIG. 7) so that the magnet 240B approaches the coupled member 22B, the magnet 240B moves in the direction (the direction D8 of FIG. 7) where the magnet 240B approaches the coupled member 22B. Hereby, the distance between the magnet 240B and the coupled member 22B becomes relatively short, so that a magnetic force to be applied to the coupled member 22B becomes large. Accordingly, a force with which the vehicle side rail 12B is sandwiched between the battery 14B and the fixing member 24B becomes large, so that the vehicle side rail 12B can be more surely fixed by the battery 14B and the fixing member 24B. Thus, the battery 14B can be attached to the vehicle side rails 12B.

The battery 14B is detached from the vehicle side rails 12B in the following procedure. First, the operating lever 242B is turned in the direction (the direction D5 in FIG. 7) so that the magnet 240B separates from the coupled member 22B. At this time, the magnet 240B moves in the direction (the direction D7 in FIG. 7) where the magnet 240B separates from the coupled member 22B, so that the distance between the magnet 240B and the coupled member 22B becomes relatively long. Hereby, the magnetic force to be applied to the coupled member 22B becomes small. Accordingly, the fixation of the vehicle side rail 12B by the battery 14B and the fixing member 24B is released. After that, the opening and closing door 11B is opened, and the battery 14B is slid to outside the vehicle, so that the battery 14B is detached from the vehicle side rail 12B.

As such, in the battery device 10B provided with the vehicle attachment structure 20B, the battery 14B can be attached and detached to and from the vehicle side rails 12B by operation of the operating lever 242B. This makes it possible to easily attach and detach the battery 14B to and from the vehicle side rails 12B.

In the battery device 10B provided with the vehicle attachment structure 20B of the second embodiment described above, the coupled member 22B is placed in the battery 14B at a position corresponding to the fixing member 24B, the magnet 240B is placed in the fixing member 24B at a position corresponding to the coupled member 22B, and the operating lever 242B configured to rock the magnet 240B is connected to the magnet 240B. This makes it possible to easily attach and detach the battery 14B to and from the vehicle side rails 12B.

Further, the vehicle attachment structure 20B includes the operating lever 242B the one end of which is connected to the magnet 240B, and the fastening member 244B that connects the intermediate part of the operating lever 242B to the housing 246B in a turnable manner. Along with turning of the operating lever 242B, the magnet 240B is rocked with the fastening member 244B as a fulcrum in the direction where the magnet 240B approaches or separates from the coupled member 22B. Hereby, the attachment and detachment of the battery 14B to and from the vehicle side rails 12B can be easily performed by operation of the operating lever 242.

In the battery device 10B provided with the vehicle attachment structure 20B of the second embodiment, the battery 14B is attached at the six attachment positions of the vehicle side rails 12B via the six vehicle attachment structures 20B. However, it is not necessary to use the vehicle attachment structures 20B for all the attachment positions in the vehicle side rails 12B, provided that the vehicle attachment structure 20B is used for at least one of the attachment positions. Other fastening members such as a bolt, for example, may be used for the other attachment positions.

The second embodiment deals with a case where the vehicle attachment structure 20B is applied to the battery device 10B. However, the vehicle attachment structure 20B can be applied to any device, provided that the device is configured such that a second component is detachably attached to a first component fixed to a vehicle body.

The following describes a correspondence between main elements of the embodiments and main elements of the disclosure described in the field of MEANS FOR SOLVING PROBLEM. In the first embodiment, the cylinder head 12 corresponds to a "first component," the exhaust manifold 14 corresponds to a "second component," the fixing member 24 corresponds to a "fixing member," the coupled member 22 corresponds to a "coupled member," the magnet 240 corresponds to a "magnet," and the operating lever 242 and the fastening member 244 correspond to a "connecting mechanism." In the second embodiment, the vehicle side rail 12B corresponds to the "first component," the battery device 10B corresponds to the "second component," the fixing member 24B corresponds to the "fixing member," the coupled member 22B corresponds to the "coupled member," the magnet 240B corresponds to the "magnet," and the operating lever 242B and the fastening member 244B correspond to the "connecting mechanism."

Note that, since the embodiments are examples to specifically describe a mode for carrying out the disclosure described in the field of SUMMARY, the correspondence between the main elements of the embodiments and the main elements of the disclosure described in the field of SUMMARY does not limit the elements of the disclosure described in the field of SUMMARY. That is, the disclosure described in the field of SUMMARY should be interpreted based on the description of the field, and the embodiments are just concrete examples of the disclosure described in the field of SUMMARY.

The mode for carrying out the disclosure has been described with reference to the embodiments, but it is needless to say that the disclosure is not limited to the above embodiments at all and may be performable in various embodiments as long as the various embodiments are not beyond the gist thereof.

The present disclosure is usable in a manufacture industry for a vehicle attachment structure and so on.

What is claimed is:

1. A vehicle attachment structure used for a vehicle and configured to detachably attach a second component to a first component fixed to a vehicle body, the vehicle attachment structure comprising:

a fixing member paired up with at least part of one component out of the first component and the second component, the fixing member being configured to fix at least part of the other component out of the first component and the second component and release the fixation; and a coupled member placed in the one component at a position corresponding to the fixing member, the coupled member being made of a magnetic material, wherein the fixing member includes a magnet placed at a position corresponding to the coupled member, and a connecting mechanism connected to the magnet and configured to turn or rock the magnet so that the magnet approaches or separates from the coupled member.

2. The vehicle attachment structure according to claim 1, wherein:

the connecting mechanism includes an operating lever having one end connected to the magnet;

the connecting mechanism turns the magnet along with turning of the operating lever; and the magnet has a shape with a flat section and is placed such that a flat surface of the magnet faces the coupled member along with rotation.

3. The vehicle attachment structure according to claim 2, wherein:

the fixing member is paired up with part of the first component so as to fix part of the second member by sandwiching the part of the second component between the fixing member and the part of the first component; and the coupled member is placed in the first component at a position corresponding to the fixing member.

4. The vehicle attachment structure according to claim 3, wherein:

the first component is a cylinder head; and the second component is an exhaust manifold.

5. The vehicle attachment structure according to claim 1, wherein:

the connecting mechanism includes an operating lever having one end connected to the magnet, and a connecting portion via which an intermediate part of the operating lever is turnably connected to a housing in which the magnet is accommodated; and along with turning of the operating lever, the connecting mechanism rocks the magnet with the connecting portion as a fulcrum in a direction where the magnet approaches or separates from the coupled member.

6. The vehicle attachment structure according to claim 5, wherein:

the fixing member is paired up with part of the second component so as to fix part of the first component by sandwiching the part of the first component between the fixing member and the part of the second component; and the coupled member is placed in the second component at a position corresponding to the fixing member.

7. The vehicle attachment structure according to claim 6, wherein:

the first component is a rail; and the second component includes a battery and a moving mechanism attached to the battery and configured to move over the rail.

* * * * *